United States Patent
Chung et al.

(10) Patent No.: US 8,649,666 B2
(45) Date of Patent: Feb. 11, 2014

(54) APPARATUS AND METHOD FOR GENERATING MOVING IMAGE AND APPARATUS AND METHOD FOR REPRODUCING MOVING IMAGE

(75) Inventors: Ji-hye Chung, Seoul (KR); Hye-jeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 12/732,864

(22) Filed: Mar. 26, 2010

(65) Prior Publication Data
US 2011/0064389 A1    Mar. 17, 2011

(30) Foreign Application Priority Data

Sep. 13, 2009    (KR) .................. 10-2009-0086207

(51) Int. Cl.
*H04N 5/93*    (2006.01)
*G11B 27/00*    (2006.01)
*H04N 9/80*    (2006.01)

(52) U.S. Cl.
USPC ............ 386/326; 386/290; 386/252; 386/282

(58) Field of Classification Search
None
See application file for complete search history.

(56) References Cited

U.S. PATENT DOCUMENTS

| | | | |
|---|---|---|---|
| 7,962,948 B1 * | 6/2011 | Girouard et al. | 725/115 |
| 2002/0156829 A1 | 10/2002 | Yoshimine | |
| 2003/0191816 A1 * | 10/2003 | Landress et al. | 709/219 |
| 2007/0101387 A1 | 5/2007 | Hua et al. | |

FOREIGN PATENT DOCUMENTS

| | | |
|---|---|---|
| EP | 1 936 623 A2 | 6/2008 |
| WO | 2006/113421 A2 | 10/2006 |

OTHER PUBLICATIONS

Extended European Search Report issued Jan. 21, 2011 in counterpart European Application No. 10157698.1.

* cited by examiner

*Primary Examiner* — Thai Tran
*Assistant Examiner* — Sunghyoun Park
(74) *Attorney, Agent, or Firm* — Sughrue Mion, PLLC

(57) ABSTRACT

An apparatus and a method for generating a moving image, and an apparatus and a method for reproducing a moving image are provided. The present moving image generating apparatus includes a script parsing unit which analyzes script information, a composer which generates a script to define a moving image, and a storage management unit which includes and stores setting information regarding the moving image in the script. Accordingly, a user may prevent the consumption of unnecessary resources as a moving image defined in a script is generated.

21 Claims, 5 Drawing Sheets

APPARATUS AND METHOD FOR GENERATING MOVING IMAGE AND APPARATUS AND METHOD FOR REPRODUCING MOVING IMAGE

CROSS-REFERENCE TO RELATED APPLICATIONS

This application claims priority from Korean Patent Application No. 2009-86207, filed in the Korean Intellectual Property Office on Sep. 13, 2009, the disclosure of which is incorporated herein by reference.

BACKGROUND

1. Field of the Disclosure

Apparatuses and methods consistent with the present disclosure relate to an apparatus and a method for generating a moving image, and an apparatus and a method for reproducing a moving image, and more particularly, to an apparatus and a method for generating a moving image to reduce the consumption of resources, and an apparatus and a method for reproducing a moving image thereof.

2. Description of the Related Art

Generally, when a moving image is generated, two files are stored and managed separately. One is a definition file to include a script which defines a subject constituting the moving image, and the other one is a reproduction file to reproduce/share the completed moving image. In order to reduce the volume of the reproduction file, the reproduction file is generally encoded in a video stream for generation using a codec program.

However, even if the reproduction file is encoded in a video stream for reproduction, the volume of the reproduction file is still huge and it takes a significant amount of resources to store/process/reproduce the reproduction file.

In addition, it takes a lot of time to encode the reproduction file in a video stream.

Accordingly, a method for generating a moving image which is defined in a script, and thus producing and reproducing the moving image without consuming a lot of resources is required.

SUMMARY

Exemplary embodiments of the present disclosure relate to an apparatus and a method for generating a moving image to generate and reproduce the moving image while reducing unnecessary consumption of resources, and an apparatus and a method for reproducing a moving image thereof.

A moving image generating apparatus, according to an exemplary embodiment of the present disclosure, comprises a composer which generates a script for defining a moving image comprising a template and a content and a storage management unit which stores the moving image in the script by reflecting a setting input from a user on the generated script.

The setting may include a setting regarding the script which defines the moving image.

The setting regarding the script may relate to a storage location of the script, whether to share the script, a scope of the script to be shared, or authority to edit the script.

The setting may include setting information regarding the template or the content which defines the moving image.

The setting information regarding the template and the content may relate to information regarding whether to store the template or the content, a storage location, a loading method, whether to share the template or the content, or a scope to be shared.

The moving image generating apparatus, according to an exemplary embodiment of the present disclosure, may further comprise an interface which receives selection of the template or the content from a user, and receives the setting information.

The moving image generating apparatus, according to an exemplary embodiment of the present disclosure, may further comprise an encoder which converts the moving image defined in the script with the setting information reflected thereon into a video stream and a reproduction unit which reproduces the video stream by loading the template and the content constituting the moving image which has been converted into the video stream based on the script.

A method for generating a moving image, according to an exemplary embodiment of the present disclosure, comprises generating a script to define a moving image comprising a template and a content and storing the moving image in the script by reflecting setting information input by a user on the generated script.

The setting information may include setting information regarding the script which defines the moving image.

The setting information regarding the script may relate to a storage location of the script, information regarding whether to open the script, how much of the script will be opened, or setting of authority to edit the script.

The setting information may include setting information regarding the template or the content which defines the moving image.

The setting information regarding the template and the content may relate to information regarding whether to store the template or the content, a storage location, a loading method, whether to open the template or the content, or how much of the template or the content will be opened.

A method for generating a moving image, according to an exemplary embodiment of the present disclosure, comprises encoding a moving image defined in the script on which the setting information is reflected and stored and converting the moving image into a video stream, and loading the template and the content constituting the moving image which has been converted into the video stream based on the script and reproducing the video stream.

A moving image reproducing apparatus, according to an exemplary embodiment of the present disclosure, comprises a network interface which receives a script for defining a moving image and a reproduction unit which determines a storage location of a template and a content constituting the moving image based on a script which defines the moving image, subsequently loads the template and the content, and reproduces the moving image based on the loaded template, the loaded content, and the script.

The moving image reproducing apparatus may further comprise a user interface which receives user comments, and the reproduction unit may reflect the comments on a script which defines the moving image based on setting information input by a user.

A method for reproducing a moving image, according to an exemplary embodiment of the present disclosure, comprises determining a storage location of a template and a content constituting a moving image based on a script which defines the moving image, subsequently loading the template and the content, and reproducing the moving image based on the loaded template, the loaded content, and the script.

The method for reproducing a moving image may further comprise receiving user comments, and reflecting the comments on the script which defines the moving image based on setting information input by a user.

An apparatus for generating a moving image, according to an exemplary embodiment of the present disclosure, comprises a moving image generation unit which generates a moving image based on a constitution object and defines the moving image in a script, a moving image storage unit which stores the moving image and generates a definition file and a reproduction file, wherein the definition file loads the constitution object and the reproduction file reproduces the moving image by incorporating the definition file and the constitution object.

A method for generating a moving image, according to an exemplary embodiment of the present disclosure, comprises generating a moving image based on a constitution object, defining the moving image in a script, storing the moving image, generating a definition file to load the constitution object, and generating a reproduction file to reproduce the moving image by incorporating the definition file and the constitution object.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION OF EXEMPLARY EMBODIMENTS

Figure 1:
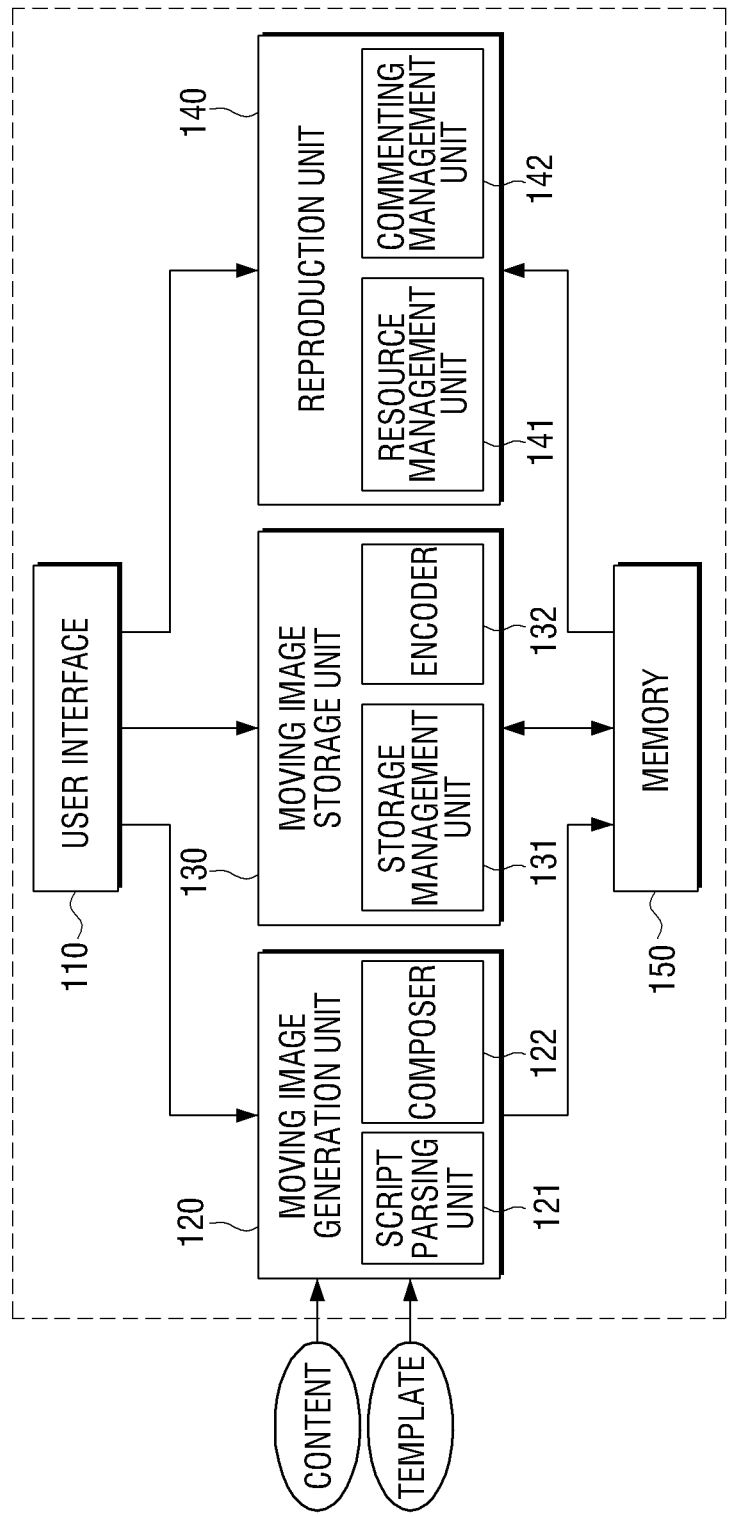
FIG. 1 is a view illustrating the structure of a moving image generating/reproducing apparatus according to an exemplary embodiment of the present disclosure.

Reference will now be made in detail to the exemplary embodiments of the present disclosure, examples of which are illustrated in the accompanying drawings, wherein like reference numerals refer to like elements throughout. The exemplary embodiments are described below, in order to explain the present disclosure by referring to the figures.

FIG. 1 is a view illustrating the structure of a moving image generating/reproducing apparatus according to an exemplary embodiment of the present disclosure. The moving image generating/reproducing apparatus, according to an exemplary embodiment of the present disclosure, generates and reproduces a moving image which is defined in a script.

The moving image generating/reproducing apparatus comprises a user interface 110, a moving image generation unit 120, a moving image storage unit 130, a reproduction unit 140, and a memory 150.

The user interface 110 transmits a command to generate a moving image, a command to store the moving image, and a command to reproduce the moving image to the moving image generation unit 120, the moving image storage unit 130, and the reproduction unit 140 respectively according to a user manipulation.

The moving image generation unit 120 generates a moving image based on a constitution object selected through the user interface 110.

The constitution object represents a content and a template. The content refers to various information and substances including, for example, a character, a symbol, audio, sound, a picture, an image, and/or video, and the template refers to a frame to dispose the content.

Specifically, the template refers to, for example, a layout in which the content is disposed, a transition in which effects related to the content are generated/removed, an animation in which the location and size of the content are changed, and/or a timing in which the content is displayed.

The content may be stored in an internal or an external content storage module (not shown), and the template may be stored in an internal or an external template storage module (not shown). Accordingly, a user may select part or all of the contents stored in the content storage module (not shown) and part or all of the templates stored in the template storage module (not shown) to constitute a moving image according to the selected content and template. The content and template are presented in a markup language such as a HyperText Markup Language (HTML).

The moving image generation unit 120 comprises a script parsing unit 121 and a composer 122.

The script parsing unit 121 parses a script which defines the content and template selected by a user through the user interface 110 and transmits it to the composer 122. The composer 122 connects the parsed script and defines the constitution of the moving image in a script to generate the moving image.

The composer 122 transmits the generated moving image to the memory 150 and stores it.

The moving image storage unit 130 determines how to store the moving image based on the moving image stored in the memory 150 and the user manipulation input through the user interface 110, generates a definition file to load each object constituting the moving image based on the determined storage method, and generates a reproduction file to reproduce the moving image by incorporating the definition file and the constitution object.

If an object constituting a moving image is stored in a specific location, the definition file, which is composed of a script, loads and plays each constitution object to generate the moving image.

The reproduction file represents a moving image file which is generated by incorporating each constitution object and the definition file.

The moving image storage unit 130 comprises a storage management unit 131 and an encoder 132.

The storage management unit 131 determines a final form and type of a moving image according to the use and purpose of the moving image, and stores the moving image in an active form. In particular, the storage management unit 131 may determine how to store the moving image and how to share the moving image, and reflect the information on a script to store the moving image in the memory 150.

In the above description, the composer 122 transmits the generated moving image to the memory 150 and stores it. However, the composer 122 stores a moving image of which constitution object is stored in a script in the memory 150, whereas the storage management unit 131 not only stores the constitution object, but also stores the information regarding how to load the constitution object and whether to support sharing the constitution object which is stored in a script in the memory 150.

That is, the moving image stored in the memory 150 by the composer 122 is changed, converted, or updated by the storage management unit 131 and then stored in the memory 150.

Meanwhile, the type of storing a moving image may be determined before the moving image is stored. For instance, the storage location of a script (that is, a definition file), a content, or a template may be designated before the moving image is stored. Accordingly, the storage management unit 131 may store only the script and designate paths for streaming the content and the template according to a user manipulation through the user interface 110, and thus may store the script, the content and the template at a separate location.

In addition, the storage management unit 131 may reflect the information regarding the storage location of a moving image file generated by incorporating a script and a constitution object by the encoder 132 on a script. The encoder 132 will be explained later.

The information regarding how to share a moving image may be stored along with the moving image. For instance, whether to allow the sharing of the moving image, and if the sharing is allowed, whether to distribute only a script or a script along with a constitution object, whether to distribute the constitution object and the script to a different location, whether to allow the editing of the script, whether to allow the commenting on the image, and if the editing and the commenting are allowed, the scope of the editing and commenting may be determined.

The storage management unit 131 stores the moving image of which the final form and type have been defined in a script in the memory 150.

The encoder 132 incorporates a constitution object and a definition file to generate a reproduction file which is a general moving image file. In particular, the encoder 132 generates a reproduction file (a moving image file) in a video stream by incorporating and encoding the constitution object and the definition file.

The definition file or the reproduction file generated by the moving image storage unit 130 may be stored in the memory 150 or be transmitted to the outside.

The reproduction unit 140 reproduces the moving image stored in the memory 150, or reproduces a moving image based on the definition file or the reproduction file received from the outside. For instance, if a moving image is generated in a moving image generating/reproducing apparatus, the moving image may be reproduced using a tool for editing the moving image, if only a definition file generated from the outside is received, the moving image may be reproduced by loading a constitution object stored in each storage location of the constitution object through the definition file, and if a reproduction file generated from the outside is received, the moving image may be generated by executing the reproduction file itself.

The reproduction unit comprises a resource management unit 141 and a commenting management unit 142.

If a command to reproduce a moving image is input through the user interface 110, the resource management unit 141 determines the physical location (storage location) of a constitution object according to the storage type, and loads each constitution object from the storage location of each constitution object to facilitate reproduction. That is, the resource management unit 141 analyzes how each of the constitution object which constitutes the moving image is formed, and determines how to approach each constitution object based on the analysis.

For instance, if a moving image is a definition file, the resource management unit 141 analyzes the definition file in a script, approaches the storage location of each constitution object defined in the definition file, and loads the constitution object to reproduce the moving image.

If the moving image is a reproduction file, the resource management unit 141 executes the reproduction file itself to reproduce the moving image.

If there are comments on the moving image, the commenting management unit 142 reflects the information regarding the comments on the script of the definition file. Specifically, a function to allow the commenting on a generated moving image is set while the moving image is reproduced, the commenting management unit 142 reflects the information regarding the comments input from a user on the script of the definition file.

The memory 150 is a storage medium to store a definition file and a reproduction file, and is realized as, for example, a HDD or a flash memory. In the exemplary embodiment of the present disclosure, the content and the template to be selected by a user are not stored in the memory 150, but this is only an example. The technical feature of the present disclosure may be applied when at least one of the content and the template to be selected by the user is stored in the memory 150.

In the above description, both the generation and reproduction of the moving image have been performed in the moving image generating/reproducing apparatus, but this is only an example. The moving image generating apparatus and the moving image reproducing apparatus may be provided separately. In this case, the moving image generation unit 120, the moving image storage unit 130, and the reproduction unit 140 may be realized separately.

Hereinbelow, the process of generating and reproducing a moving image will be explained with reference to FIG. 2 and FIG. 3.

Figure 2:
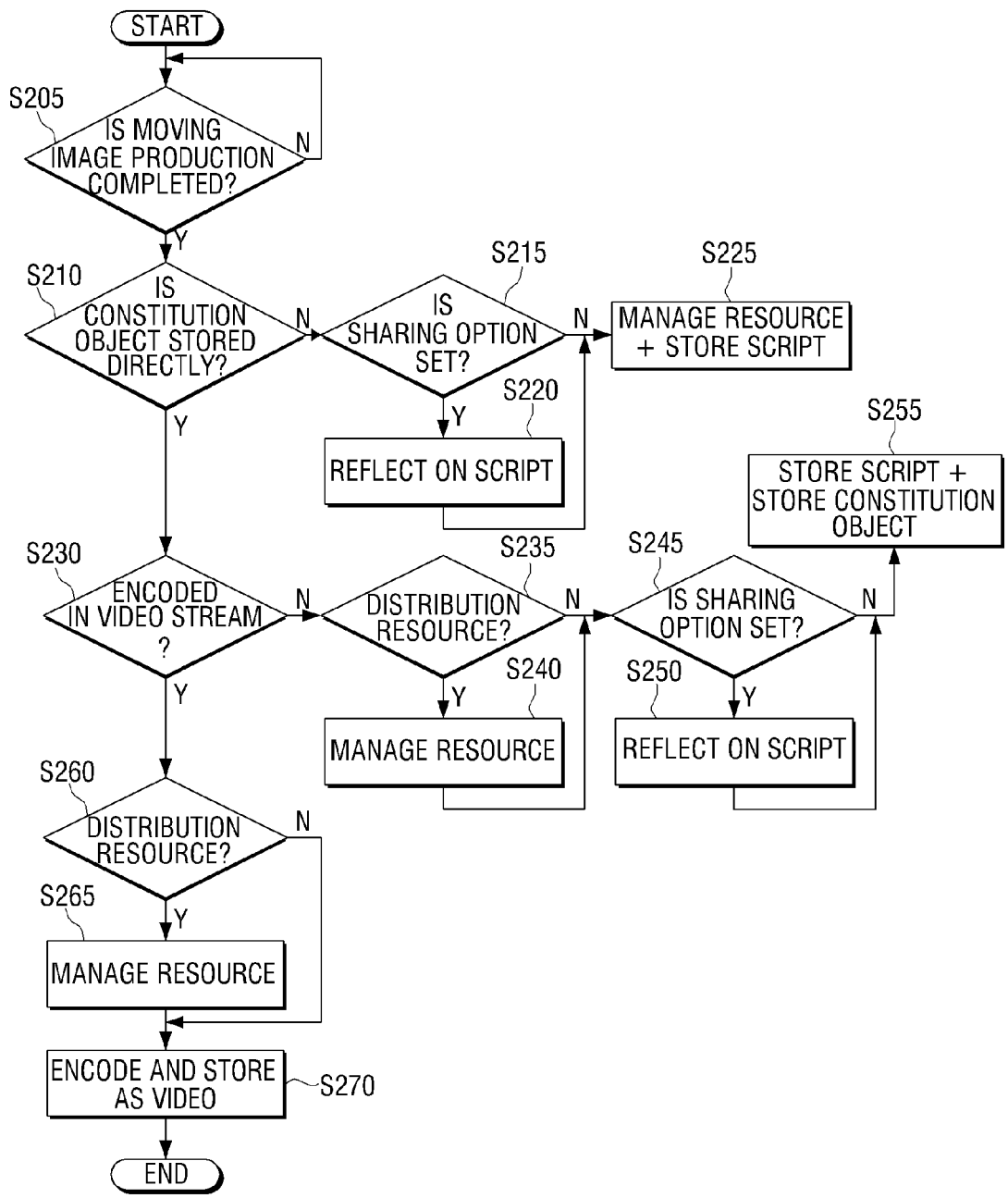
FIG. 2 is a view provided to explain the process of generating a moving image.

FIG. 2 is a view provided to explain the process of generating a moving image. As illustrated in FIG. 2, if the production of a moving image is completed (S205-Y), a user may determine whether the constitution object is stored directly or separately (S210). Whether the constitution object is stored directly or separately includes the concept of whether a content and a template are stored directly or separately.

If it is determined that the constitution object is not stored directly (S210-N), it is determined whether or not to set an option for sharing a moving image (S215). If the option for sharing the moving image is set (S215-Y), the moving image generating/reproducing apparatus reflects the sharing option set on a script (S220).

If the sharing option is not set (S215-N), or the sharing option is set and reflected on the script (S220), the moving image generating/reproducing apparatus performs resource management on the constitution object and stores the script (S225). The resource management, which is performed by the above-mentioned resource management unit 141, is an operation to determine how to approach each of the constitution objects by analyzing how each of the constitution objects of the moving image is formed.

If the constitution object is stored directly (210-Y), it may be encoded in a video stream and then stored (S230). If the constitution object is encoded in a video stream and stored (S230-Y), and it is determined to be distribution resource (S260-Y), the moving image is stored as a video through encoding (S270) after resource management is performed (S265). If it is determined not be distribution resource (S260-N), the moving image is stored as a video through encoding (S270) without resource management.

If the constitution object is not encoded in a video stream (S230-N) and is determined to be distribution resource (S235-Y), resource management is performed (S240).

Subsequently, a user may set an option for sharing the moving image (S245). If the sharing option is set (S245-Y), the moving image generating/reproducing apparatus reflects the set sharing option on a script (S250).

If the sharing option is not set (S245-N) or the sharing option is reflected on the script (S250), the moving image generating/reproducing apparatus stores the script on which the sharing option is reflected and the constitution object (S255).

As such, by generating a moving image defined in a script, a user may prevent the consumption of unnecessary resources.

Figure 3:
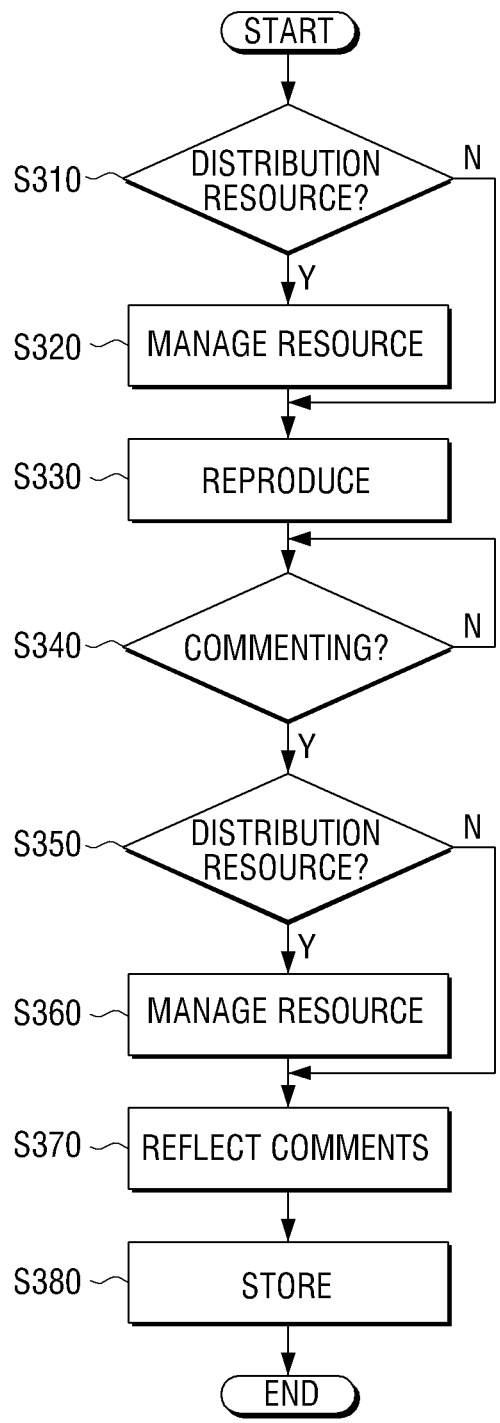
FIG. 3 is a view provided to explain the process of reproducing a moving image.

FIG. 3 is a view provided to explain the process of reproducing a moving image.

If a command to reproduce the moving image is input, the moving image generating/reproducing apparatus determines whether it is a distribution resource or not (S310). If it is determined to be a distribution resource (S310-Y), the moving image is reproduced (S330) after resource management (S320), and if it is determined not to be a distribution resource (S310-N), the moving image is reproduced (S330) without resource management.

If comments are input while the moving image is reproduced (S340-Y), it is determined whether it is distribution resource or not (S350). If it is determined to be a distribution resource (S350-Y), the comments are reflected (S370) after resource management (S360), and if it is determined not to be a distribution resource (S350-N), the comments are reflected (S370) without resource management.

Subsequently, the script on which the comments are reflected is stored (S380).

Figure 4:
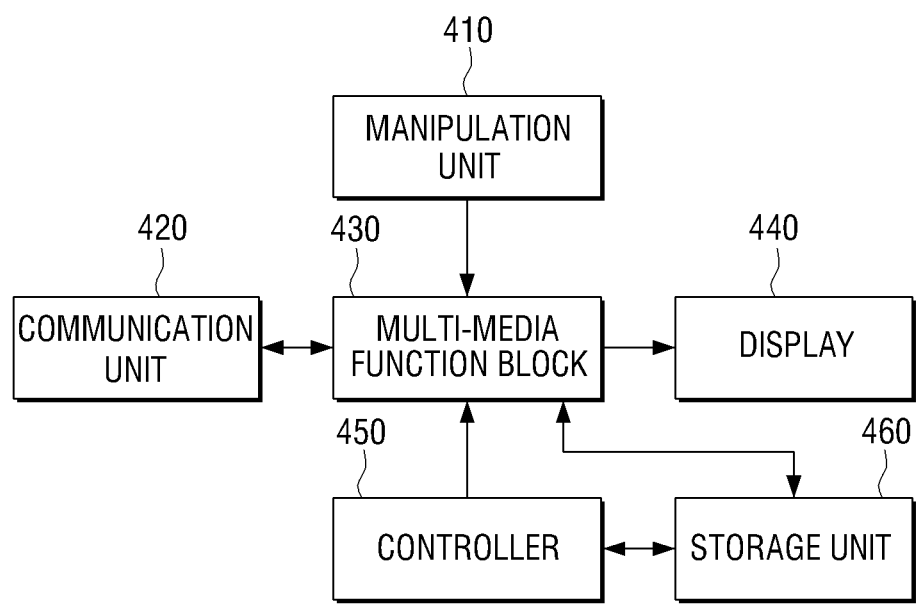
FIG. 4 is a view illustrating the structure of an electronic picture frame to which the present disclosure is applicable.

FIG. 4 is a view illustrating the structure of an electronic picture frame to which the present exemplary embodiment is applicable. For convenience of explanation, the only structure necessary for the explanation of the present exemplary embodiment is illustrated in FIG. 4.

The electronic picture frame is an apparatus to output various video/audio data, and a user may view, edit, or transmit the content stored internally or externally using the electronic picture frame.

The electronic picture frame may be realized as the above-mentioned moving image generating/reproducing apparatus. That is, the electronic picture frame not only performs its original function of displaying a content for a user, but also generates and reproduces the moving image formed in contents and a template.

The electronic picture frame of the exemplary embodiment comprises a manipulation unit 410, a communication unit 420, a multi-media function block 430, a display 440, a controller 450, and a storage unit 460. The manipulation unit 410 corresponds to the above-mentioned user interface 110, the multi-media function block 430 corresponds to the above-mentioned moving image generation unit 120, the moving image storage unit 130 and the reproduction unit, and the storage unit 460 corresponds to the above-mentioned memory 150.

The communication unit 420 receives a content and a template from the outside.

The display 440 displays a content according to the original function of the electronic picture frame, or is used to reproduce the moving image formed in a content and a template.

The controller 450 controls the overall operation of the electronic picture frame, and thus causes the electronic picture frame not only to perform its original function but also to generate a moving image.

In the above description, the moving image generating/reproducing apparatus may be realized as an electronic picture frame, but this is only an example. The moving image generating/reproducing apparatus may be realized not only as an electronic picture frame but also as various multi-media apparatuses such as a TV, a PC, or a PMP.

Figure 5:
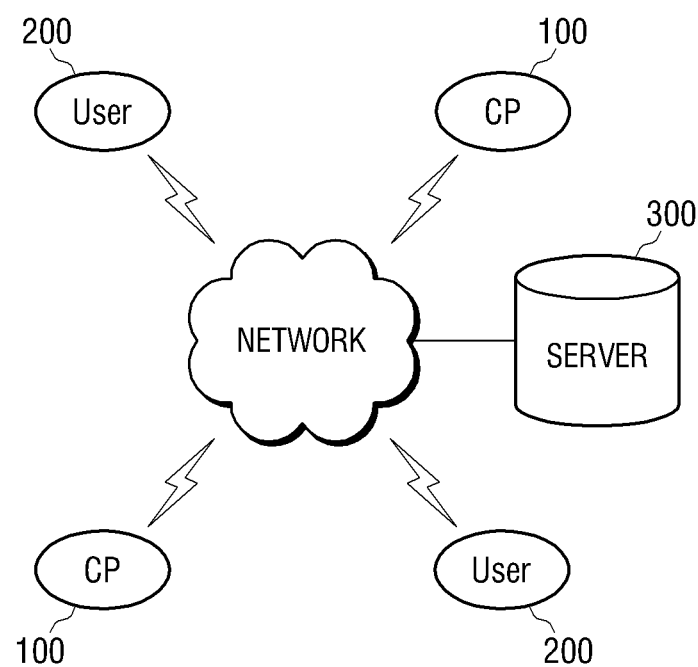
FIG. 5 is a view illustrating an environment for generating/reproducing a moving image.

FIG. 5 is a view illustrating an environment for generating/reproducing a moving image. As illustrated in FIG. 5, there are a plurality of content providers (CPs) 100, a plurality of users 200 and a server 300 in an environment for generating/reproducing a moving image.

One of the content providers CP 100 generates a moving image and provides it to another CP 100 or the user 200. The CP 100 which generates a moving image stores the generated moving image directly or stores the generated moving image in the server 300 through a network. In this case, as described above, the moving image is defined in a script and then stored inside the CP 100 or in server 300.

In order to generate a moving image, the CP 100 may comprise the above-mentioned moving image generation unit 120 and the moving image storage unit 130. Accordingly, the CP 100 generates a moving image based on the selected constitution object, and parses and connects the script defining the content and the template selected by a user, thereby defining the constitution type of the moving image in a script to generate the moving image.

In addition, the CP 100 determines how to store the moving image, generates a definition file to load each constitution object constituting the moving image according to the determined storage type, and generates a reproduction file to reproduce the moving image by incorporating the definition file and the constitution object.

Furthermore, the CP 100 may store the moving image of which final form and type are defined in a script in an internal memory or the server 300, generate a reproduction file, which is a general moving image file, by incorporating a constitution object with a definition file, and store the reproduction file in the internal memory or the server 300.

In addition, the CP 100 may download and reproduce a moving image generated from another CP, and in this case, may comprise the above-mentioned reproduction unit 140.

The user 200 corresponds to the user of a moving image, and downloads and generates the moving image stored in the CP 100 or the server 300 through a network. In order to reproduce the moving image, the user 200 may comprise the above-mentioned reproduction unit 140.

Accordingly, the user 200 may determine the physical location (storage location) of a constitution object according to the designated type of reproducing the moving image which has been downloaded from the PC 100 or the server 300, and load each constitution object from the storage location of each constitution object to facilitate reproduction. That is, the user 200 analyzes how each of the constitution object which constitutes the moving image is formed, and determines how to approach each constitution object based on the analysis.

For instance, if the moving image downloaded from the CP 100 or the server 300 is a definition file, the user 200 analyzes a definition file in a script, approaches the storage location of each constitution object defined by the definition file, and loads the constitution object to reproduce the moving image. If the moving image is a reproduction file, the user may execute the downloaded reproduction file itself to reproduce the moving image.

In the above description, the CP 100 and the user 200 are connected with the network wirelessly, this is only an example. The technical feature of the exemplary embodiment may be applied when the CP 100 and the user 200 are connected with the network with wire.

Accordingly, a user may prevent the consumption of unnecessary resources as a moving image defined in a script is generated.

Although a few exemplary embodiments of the present disclosure have been shown and described, it would be appreciated by those skilled in the art that changes may be made in these exemplary embodiments without departing from the principles and spirit of the invention, the scope of which is defined in the claims and their equivalents.

What is claimed is:

1. A moving image generating apparatus using a definition file, comprising:
    a moving image generation unit which generates a moving image using a script defining a template and a content; and
    a moving image storage unit which determines how to store the moving image based on a user input,
    wherein when the template and the content are not stored in the moving image generating apparatus, the moving image storage unit is further configured to generate the definition file to load and reproduce each of the template and the content and when the template and the content are stored in the moving image generating apparatus, the moving image storage unit is further configured to generate a reproduction file which is a moving image file comprising the template, the content, and the definition file,
    wherein the definition file comprises information relating to a download path for each of the template and the content.

2. The moving image generating apparatus according to claim 1, further comprising:
    a reproduction unit which reproduces the moving image,
    wherein the reproduction unit downloads the template and the content using the information relating to the download path and reproduces the moving image using the downloaded template and the downloaded content.

3. The moving image generating apparatus according to claim 2, wherein the moving image storage unit generates the moving image by incorporating the definition file and each of the template and the content, and the reproduction unit executes a reproduction file to reproduce the moving image.

4. The moving image generating apparatus according to claim 1, wherein the definition file includes setting information regarding the template or the content which defines the moving image.

5. The moving image generating apparatus according to claim 4, wherein the setting information regarding the template and the content relates to whether to store the template or the content, a storage location, a loading method, whether to share the template or the content, or a scope to be shared.

6. The moving image generating apparatus according to claim 4, further comprising:
    an interface which receives selection of the template or the content from a user, and receives the setting information.

7. The moving image generating apparatus according to claim 4, further comprising:
    an encoder which converts the moving image defined in the script with the setting information reflected thereon into a video stream;
    wherein the reproduction unit reproduces the video stream by loading the template and the content which has been converted into the video stream.

8. The moving image generating apparatus according to claim 1, wherein the moving image storage unit stores information regarding a storage location of the generated moving image.

9. The moving image generating apparatus according to claim 1, further comprising a resource management unit which determines a physical location of a constitution object, which consists of the content and the template, according to a storage type, and loads each constitution object from the storage location of each constitution object to facilitate reproduction.

10. A method for generating a moving image by using a definition file, comprising:
    generating a moving image using a script defining a template and a content;
    determining how to store the moving image based on a user input; and
    when the template and the content are not stored, generating the definition file to load and reproduce each of the template and the content, and when the template and the content are stored, generating a reproduction file which is a moving image file comprising the template, the content, and the definition file,
    wherein the definition file comprises information relating to a download path for each of the template and the content.

11. The method for generating a moving image according to claim 10, further comprising downloading the template and the content using the information relating to the download path, and reproducing the moving image using the downloaded template and the downloaded content.

12. The method for generating a moving image according to claim 11, wherein the generating the moving image comprises incorporating the definition file and each of the template and the content, and the reproducing the moving image comprises executing a reproduction file.

13. The method for generating a moving image according to claim 10, wherein the definition file includes setting information regarding the template or the content which defines the new moving image.

14. The method for generating a moving image according to claim 13, wherein the setting information regarding the template and the content relates to information regarding whether to store the template or the content, a storage location, a loading method, whether to open the template or the content, or how much of the template or the content will be opened.

15. The method for generating a moving image according to claim 10, comprising:
    encoding the moving image defined in the script on which the setting information is reflected and converting the moving image into a video stream;
    loading the template and the content which has been converted into the video stream and reproducing the video stream.

16. A moving image reproducing apparatus, comprising:
    a network interface which receives a script which defines a template and a content;
    a moving image generation unit which generates a moving image by using the received script;
    a moving image storage unit which determines a method for storing the moving image based on a user input and, when the template and the content are not stored in the moving image reproducing apparatus, generates a definition file to load and reproduce each of the template and the content, and when the template and the content are stored in the moving image reproducing apparatus, generates a reproduction file which is a moving image file comprising the template, the content and the definition file, the definition file including information relating to a download path for each of the template and the content; and a reproduction unit which downloads the template and the content by using the information included in the definition file, and reproduces the moving image by using the downloaded template and the downloaded content.

17. The moving image reproducing apparatus according to claim 16, further comprising:

a user interface which receives user comments.

18. A method for reproducing a moving image, comprising:

generating a moving image by using a script which defines a template and a content;

determining a method for storing the moving image based on a user input and when the template and the content are stored, generating a definition file to load and reproduce each of the template and the content, and when the template and the content are not stored, generating a reproduction file which is a moving file comprising the template, the content and the definition file, the definition file including information relating to a download path for each of the template and the content;

downloading the template and the content by using the information included in the definition file; and reproducing the moving image by using the downloaded template and the downloaded content.

19. The method for reproducing a moving image according to claim 18, further comprising:

receiving user comments.

20. An apparatus for generating a moving image, comprising:

a composer which generates a script for defining a moving image wherein the moving image comprises a template and a content;

a moving image generation unit which generates the defined moving image by using the generated script;

a moving image storage unit which determines a method for storing the moving image based on a user input and which, when the template and the content are not stored in the apparatus, generates a definition file to load and reproduce each of the template and the content, and when the template and the content are stored in the apparatus, generates a reproduction file which is a moving image file comprising the template, the content, and the definition file, wherein the definition file includes information relating to a download path for each of the template and the content; and a reproduction unit which downloads the template and the content by using the information relating to the download path, and reproduces the moving image by using the downloaded template and the downloaded content.

21. A method for generating a moving image, comprising:

generating a script for defining a moving image wherein the moving image comprises a template and a content;

generating the defined moving image by using the generated script;

determining a method for storing the moving image based on a user input and when the template and the content are not stored, generating a definition file to load and reproduce each of the template and the content, and when the template and the content are stored, generating a reproduction file which is a moving image file comprising the template, the content and the definition file, wherein the definition file includes information relating to a download path for each of the template and the content;

downloading the template and the content by using the information relating to the download path; and reproducing the moving image by using the downloaded template and the downloaded content.

* * * * *